United States Patent [19]

Herring

[11] Patent Number: 4,568,404

[45] Date of Patent: Feb. 4, 1986

[54] METHOD OF MAKING SNAP-ON PLASTIC COVER FOR SUN-DAMAGED VINYL-COVERED DASHBOARD PADS

[76] Inventor: Asa Herring, 2201 W. Potter, Phoenix, Ariz. 85027

[21] Appl. No.: 718,167

[22] Filed: Apr. 1, 1985

Related U.S. Application Data

[62] Division of Ser. No. 447,146, Dec. 6, 1982, Pat. No. 4,508,381.

[51] Int. Cl.⁴ .............................................. B32B 31/18
[52] U.S. Cl. .................................... 156/245; 156/250; 156/256; 156/285; 156/267; 180/90; 264/553; 264/554; 264/571; 280/752; 296/70
[58] Field of Search ............... 156/242, 245, 285, 267, 156/250, 256; 264/101, 500, 544, 553, 554, 571; 180/90; 280/752; 296/70, 72

[56] References Cited

U.S. PATENT DOCUMENTS 2,510,845  6/1950  Waters et al. ................. 49/460
3,770,546  11/1973  Childress et al. ............... 156/285

FOREIGN PATENT DOCUMENTS 685141  4/1964  Canada ........................... 264/553
9005020  1/1984  Japan ............................. 264/553
9038018  3/1984  Japan ............................. 264/553

*Primary Examiner*—Caleb Weston
*Attorney, Agent, or Firm*—Cahill, Sutton & Thomas

[57] ABSTRACT

A rigid snap-on plastic cover for a sun-damaged vinyl-covered dashboard pad is installed in an automobile without loosening or removing the dashboard pad from a dashboard substructure. The snap-on cover is made by draping a preheated softened polycarbonate sheet over a mold positioned on a narrowed support. A partial vacuum is produced in the region covered by the draped polycarbonate material, causing it to be drawn against the mold for support and to conform thereto. A skirt portion of the polycarbonate material from the support is severed after the vacuum is released, and the forward portion of the hardened polycarbonate is lifted over the mold, forcing any breakage of the "back draft" portion of the polycarbonate to occur in forward corner locations that will not be visable when the snap-on cover is installed in the automobile. The peripheral portions of the polycarbonate material are cut cleanly away and the outer surface is spray painted. The cover then is snapped into position over the vinyl covered dashboard pad in the automobile, after applying glue to the inner surface.

6 Claims, 10 Drawing Figures

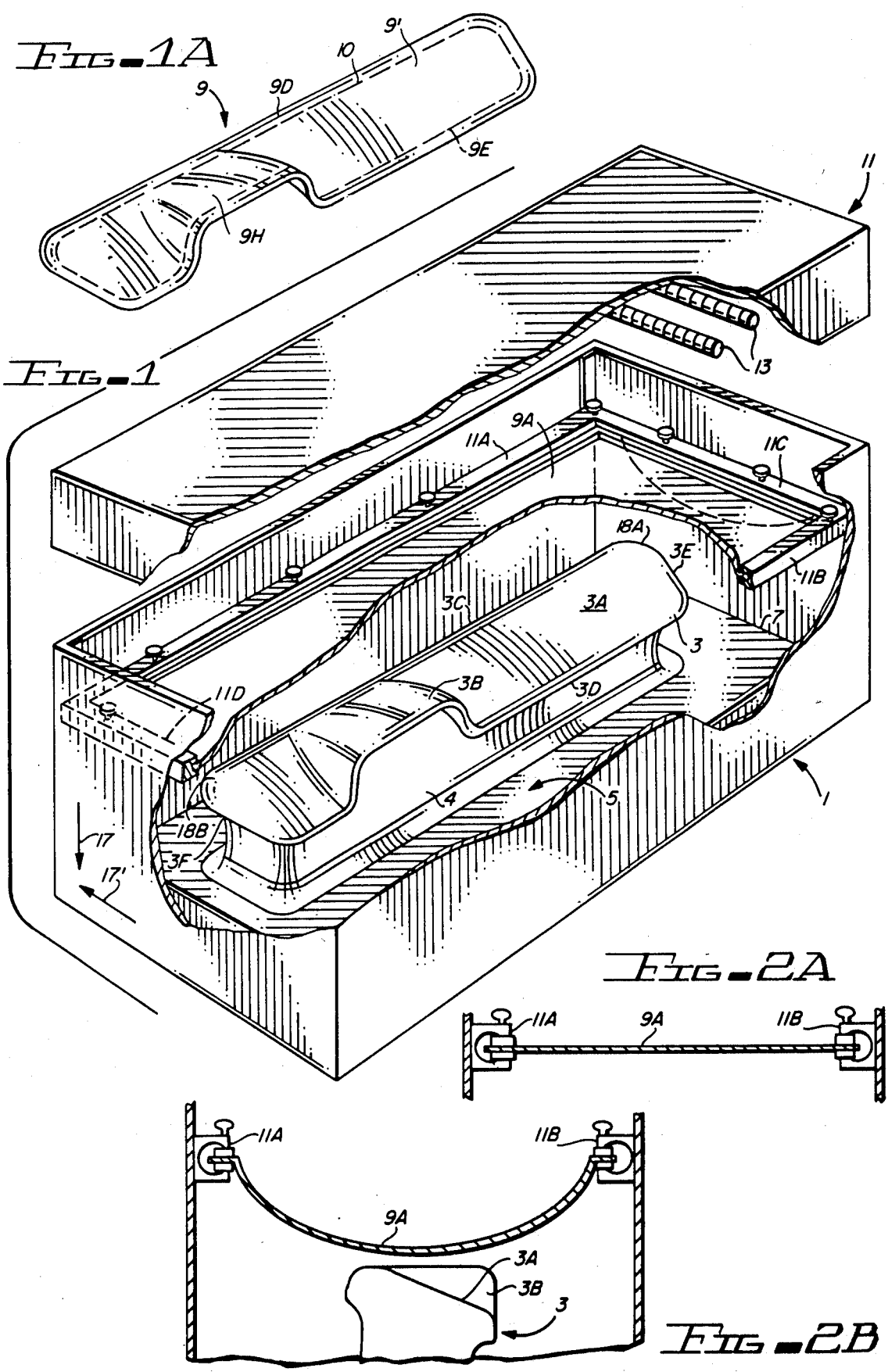

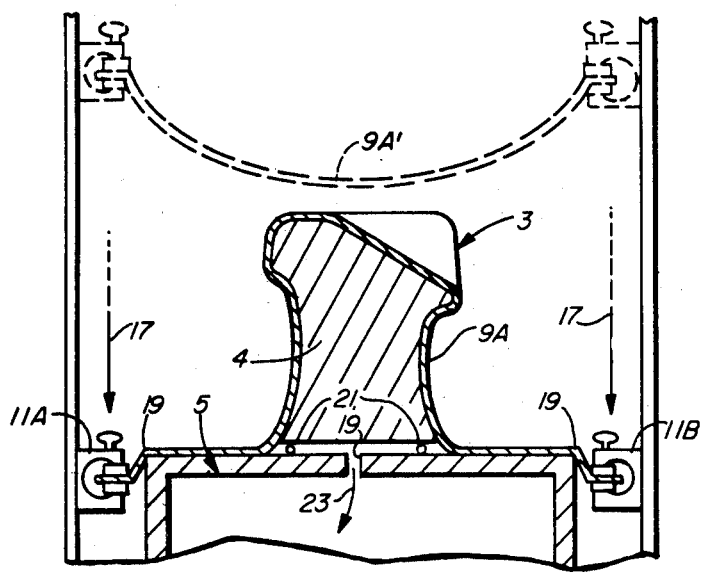
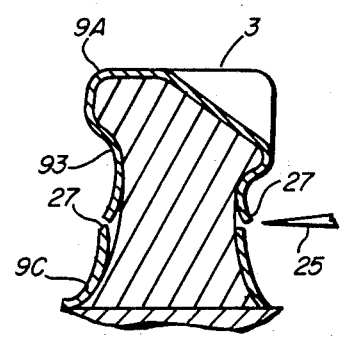
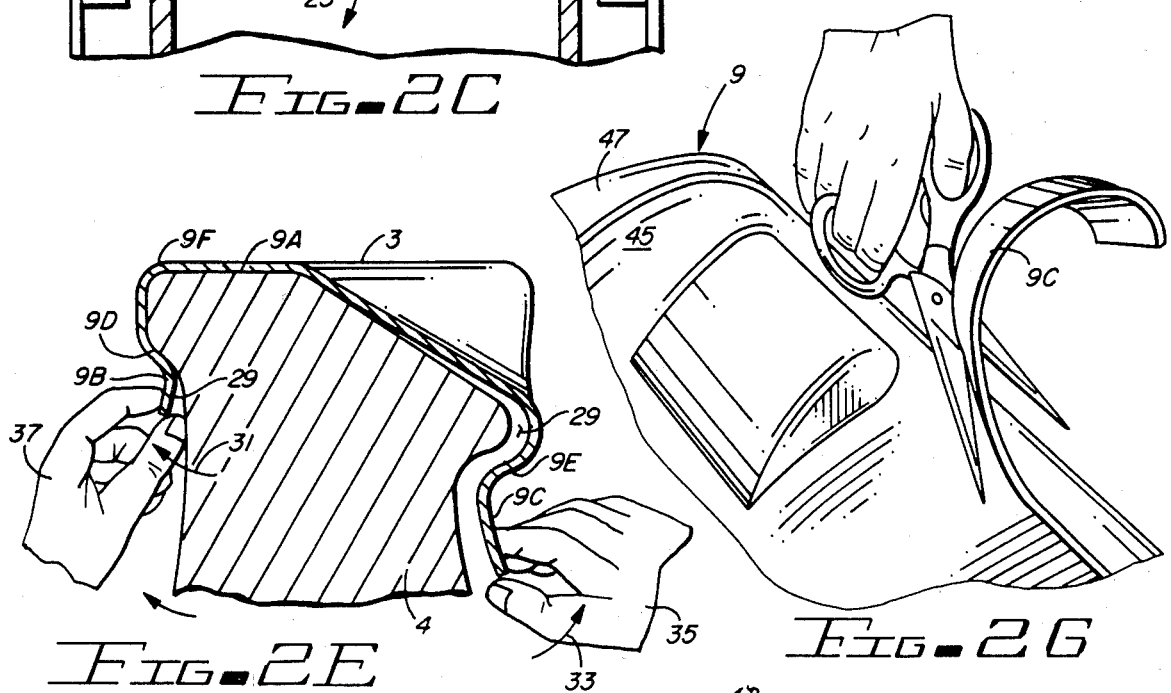
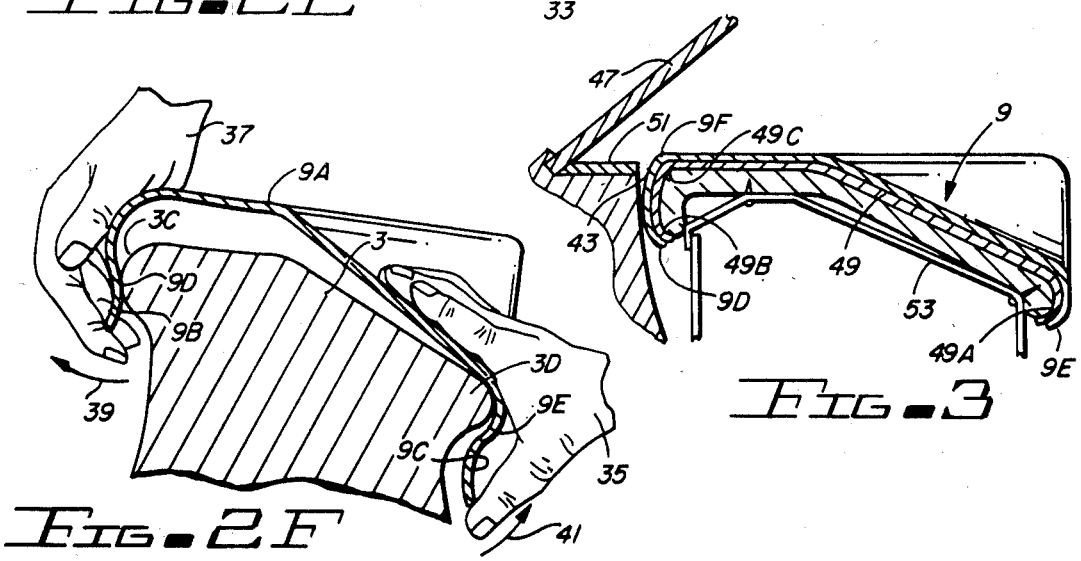

METHOD OF MAKING SNAP-ON PLASTIC COVER FOR SUN-DAMAGED VINYL-COVERED DASHBOARD PADS

This is a division of application Ser. No. 447,146, filed Dec. 6, 1982 U.S. Pat. No. 4,508,381.

BACKGROUND OF THE INVENTION

The invention relates to protective covers for automobile vinyl-covered dashboard pads, especially covers which can be installed over vinyl coverings which have been damaged and cracked due to excessive exposure to sunlight and heat; the invention relates more particularly to covers that can be installed without loosening or removing the vinyl covered dashboard pads from rigid dashboard substructures in automobiles; the invention also relates to methods for making such protective covers.

By way of background, it should be appreciated that the vinyl covering which is usually provided on dashboard pads in automobiles cannot withstand prolonged exposure to sunlight and heat for many years. The vinyl is ordinarily dark colored, and rapidly absorbs heat when exposed to intense sunlight. Over a several year period of continual daytime exposure to sunlight, the vinyl tends to become brittle. It also tends to shrink and expand as a result of repeated heating and cooling. is, combined with the increasing brittleness, often leads to unattractive cracks in the vinyl covering. This problem is especially pronounced in the hotter regions of the United States, such as Arizona. The problem has long been a disturbing one to car owners, since many owners need to leave their cars parked in the sunlight both during working hours and when they are at home. Many apartment dwellers have no covered parking facilities for their cars at any time, and the vinyl dashboard covering is exposed to intense sunlight almost every day. With the recent sharp increases in the prices of automobiles, automobile manufacturers have been cutting costs in every feasible way; one of the cost cutting measures has been use of lower quality covering for dashboard pads. The high cost of automobiles and generally weak economic conditions have resulted in owners keeping their automobiles longer than in the past.

These factors have made it more desirable than ever before that the unsightly cracking of vinyl covering for dashboard pads be somehow avoided. Although automobile manufacturers sometimes can supply new vinyl covered replacement dashboard pads, they are very expensive; the typical cost for a dashboard pad for medium sized, medium priced American automobile is approximately $150.00. The labor costs of removing the old dashboard pad and installing a new one must be added to this cost. For a few automobile models, a dashboard pad can be removed and replaced with a new one in less than an hour. Nevertheless, the labor cost actually charged usually will be approximately $70.00. For many automobile models, between one and eight hours of labor are required, and in a few models, the difficulty of removing an old dashboard pad and replacing it with a new one is so prohibitive that it is virtually impossible to find anyone who will even undertake the job for less than an outrageous fee.

In short, replacement of dashboard pads with sun damaged vinyl covering is expensive and impractical. There is a great need for a less expensive, more practical solution to the problem. Yet, no practical solutionsto the above problems have emerged. A few enterprises have attempted to provide new covers for dashboard pads using vacuum forming techniques to provide a new thermoplastic covering therefore. These techniques, unfortunately, require removal of the dashboard pads, and have proved to be nearly as unacceptable as the expedient of simply replacing damaged dashboard pads with brand new dashboard pads supplied by the manufacturer. Filling the above-mentioned cracks with liquid vinyl has been attempted. This approach, although very inexpensive, is also very unsatisfactory because the vinyl filler material usually is quite visible. Furthermore, after only a few months of exposure to sunlight, it becomes brittle and also cracks.

Thus, it can be seen that there is a great unfulfilled need for an economical means for prolonging the useful life of vinyl covered dashboard pads without incurring unacceptably high costs.

Accordingly, it is an object of the invention to provide a low cost protective covering for automobile dashboard pads.

It is another object of the invention to provide an inexpensive, durable, easily installed, attractive cover for sun damaged dashboard pads.

It is another object of the invention to provide a cover for automobile dashboard pads which can be securely and permanently installed without the necessity of loosening or removing the sun damaged dashboard pad.

It is another object of the invention to provide an economical method for making such low cost, easily installed, attractive durable covers for sun-damaged dashboard pads.

SUMMARY OF THE INVENTION

Briefly described, and in accordance with one embodiment thereof, the invention provides a rigid snap-on plastic cover for installation on an automobile dashboard pad without requiring removal of the dashboard pad from the rigid dashboard substructure, wherein the snap-on cover includes an upper portion preshaped to conform to the contours of the upper portion of the dashboard pad and a lower peripheral "back draft" portions that conforms to the shape of the peripheral portion of the dashboard pad to securely grip the peripheral portions thereof. The snap-on cover is composed of polycarbonate material in the described embodiment of the invention, the polycarbonate material preferably having a leather-like grain or finish on the outer surface, and preferably is painted or dyed to achieve a suitable dark color. Glue is applied to the appropriate surfaces of the snap-on cover before snapping the peripheral back draft portion of the snap-on cover over the peripheral portions of the dashboard pad. The peripheral portions of the snap-on cover are to some extent tucked and forced between the dashboard pad and the dashboard substructure, especially the peripheral back draft portions closest to the front seat of the automobile, so that the edges of the snap-on cover are not noticeable or visible to the driver or passenger.

The method of making the snap-on cover includes preheating a sheet of suitable thermoplastic material supported in a clamp frame to a sufficiently high temperature that a substantial predetermined amount of softening and sagging of the sheet occurs due to plastic flow thereof, rapidly lowering the clamp frame to drape the heated plastic sheet over a mold that conforms to the shape of the dashboard pad, the mold being supported on a narrowed pedestal or support, the lowered clamp frame holding the skirt portions of the draped thermoplastic sheet in sealed relationship against the edges of a support surface. Air in the regions enclosed by the support surface and the draped sheet is quickly evacuated, causing outside atmospheric pressure to rapidly force the hot, soft thermoplastic material against the mold and pedestal, causing it to plastically conform precisely to the features of the mold and pedestal. As the temperature of the thermoplastic material falls rapidly, the lower skirt portion of the thermoplastic material is quickly severed from the upper portion thereof. When the temperature of the thermoplastic material falls to a temperature whereat it has become quite rigid, the forward portion of the snap-on cover being formed is slightly separated from the pedestal and the forward portion of the mold, and is lifted and forced around the peripheral forward portion of the mold, causing any rupturing or breakage of the back draft portion of the snap-on cover to occur at the forward corner portions thereof, where such cracking will be unnoticeable when the snap-on cover is installed on the dashboard pad in the automobile. The snap-on cover is then removed entirely from the mold, and the remaining peripheral skirt portions are cleanly cut away. After suitable coloring, either by spray painting or spray dyeing, the manufacture of the snap-on cover is complete. After application of suitable glue on the inner surface of the snap-on cover and on the surface of the dashboard pad, the snap-on cover is simply "snapped" onto the dashboard pad by first positioning the rearward portion of the snap-on cover in proper alignment with the rearward portion of the dashboard cover and then sliding the forward back draft portion of the snap-on cover over the forward peripheral portions of the dashboard pad, any additional fracturing or breaking being confined to the forward corner peripheral back draft portions of the snap-on cover, where they will be mostly hidden from view.

BRIEF DESCRIPTION OF THE DRAWINGS

FIG. 1 is a partial cutaway perspective view of an apparatus useful in thermoforming of the snap-in cover of the present invention.

FIG. 1A is a perspective view of the snap-on cover of the present invention.

FIG. 2A is a section view illustrating the configuration of the polycarbonate sheet that is thermoformed in the apparatus of FIG. 1 prior to preheating thereof.

FIG. 2B is a section view showing the sagging of the heated softened polycarbonate sheet positioned over the mold in the device of FIG. 1.

FIG. 2C is a section view useful in explaining the procedure for draping the heated polycarbonate sheet over the dashboard mold and creating a partial vacuum which causes the preheated polycarbonate sheet to conform to the shape of the mold and pedestal supporting it.

FIG. 2D is a section view illustrating the procedure of severing part of the skirt portion of the polycarbonate material from the upper portion thereof.

FIG. 2E is a section view illustrating the technique for loosening the snap-on cover from the mold.

FIG. 2F is a section view illustrating the technique for removing the hardened snap-on cover from the mold.

FIG. 2G is a partial perspective view illustrating trimming the remaining skirt portions from the snap-on cover.

FIG. 3 is a section view illustrating the snap-on cover installed on a pre-existing dashboard cover of an automobile.

DESCRIPTION OF THE INVENTION

Referring now to the drawings, particularly FIG. 1A, snap-on cover 9 is composed of rigid polycarbonate material, which may be either transparent or painted or dyed to a suitable dark color. Snap-on cover 9 includes an upper portion 9', a forward curved peripheral lip or "back draft" portion 9D which extends around and slightly beneath a peripheral portion of a vinyl covered dashboard pad. Snap-on cover 9 also includes a rearward curved peripheral back draft portion 9E which extends around a rearward peripheral portion of the dashboard pad on which snap-on cover 9 is to be installed. In FIG. 1A, reference numeral 10 designates the edge of the peripheral lip portion mentioned above. The peripheral lip portion is substantially continuous around the entire periphery of snap-on cover 9, including the end peripheral portions. Reference numeral 9H designates an upward contoured region that surrounds the instrument cluster of a typical automobile.

FIG. 1 designates a generalized thermoforming apparatus which can be used to make snap-on cover 9. Apparatus 1 includes therein a table 5 having a flat upper surface on which a pedestal 4 is supported. A mold 3, which is a replica of a dashboard pad, is supported on pedestal 4. Reference numerals 3C, 3D, 3E, and 3F designate the forward, rearward and end peripheral portions of mold 3 which extend toward or somewhat beyond the upper portion of pedestal 4. Reference numeral 3A represents the top surface of mold 3, and reference numeral 3B designates the portion of mold 3 that corresponds to the above-mentioned contour 9H of snap-on mold 4.

Thermoforming apparatus 1 includes a four sided clamp frame including clamp members 11A, 11B, 11C. The clamp members support an initially rigid, flat polycarbonate sheet 9A in a conventional manner. Reference numeral 11 generally designates an oven or heat source which is initially used to heat polycarbonate sheet 9A to a predetermined high temperature, which may be approximately 340° F. Reference numeral 13 designates a generalized heating element.

It should be recognized that frame 11A, B, C, D can be lowered slightly below the surface of table 5 after polycarbonate sheet 9A has been heated to the point that it is highly flexible and stretchable, so that the peripheral portions of polycarbonate sheet 9A contact and form a sealing relationship with the edge 7 of table 5, thereby forming an enclosed tent-like region as the heated, softened, plastically flowable polycarbonate sheet 9A is draped over mold 3. Although it is not specifically shown in FIG. 1, it should be appreciated that pedestal 4 is slightly elevated from the flat surface of table 5, and that there is an air hole 19 (FIG. 2C) in the top of table surface 5 beneath pedestal 3 so that air can be pumped out of the region bounded by the draped polycarbonate sheet and the top surface of table 5.

With the above description of thermoforming apparatus 1 in mind, the process for making snap-on cover 9 now will be described with reference to FIGS. 2A–2G. Referring first to FIG. 2A, rigid polycarbonate sheet 9A supported as shown by clamp frame members 11A and 11B is exposed to heat produced by heating elements 13 of oven or heat source 11 by moving table 5 under heating elements, as indicated by arrow 17′ in FIG. 1. As the temperature of polycarbonate sheet 9A increases, the polycarbonate material softens and begins to plastically flow or deform and sag, as shown in FIG. 2B. It is critical that the temperature of the polycarbonate sheet 9A reach a sufficiently high temperature that when the subsequently described partial vacuum is produced, the polycarbonate sheet will rapidly and accurately, without wrinkling, plastically flow and conform precisely to the outer shapes of mold 3 and pedestal 4. The required temperature has been found to be approximately 340° F., and it can be determined when this temperature has been reached by lightly tapping sagging sheet 9A, shown in FIG. 2B. When the correct temperature has been reached, a light tapping of sagging sheet 9A produces a substantial "ripple" that propagates throughout the entire sagging sheet. The table 5 is then moved out from under heating elements 13.

The next step in the process is described with reference to FIG. 2C, wherein clamp frames 11A and 11B are rapidly lowered in the direction indicated by arrows 17 from the position indicated by dotted line 9A to the level shown in FIG. 2C. The edges 7 of table 5 seal the interior region bounded by the draped, tent-like configuration of flexible sheet 9A. Immediately air is pumped out of the region bounded by the draped polycarbonate sheet 9A through air hole 19 in the direction indicated by arrow 23 to produce a partial vacuum. Reference numeral 21 designates foot pads on pedestal 4 that allow air to be evacuated from the bounded region. This causes the polycarbonate material to be rapidly forced against and plastically flow to conform precisely to the configuration of mold 3 and pedestal 4, as shown in FIG. 2C. The temperature of the polycarbonate material rapidly falls, and it rapidly becomes relatively rigid and brittle. Within a few seconds after the polycarbonate material 9A has assumed the configuration indicated in FIG. 2C, a knife blade 25 makes a cut 27 in the "skirt" portion of polycarbonate sheet 9A circumscribing the entire pedestal, and thereby severing the lower skirt portion 9C of polycarbonate sheet 9A from an upper skirt portion 9B thereof. Roughly 15-40 seconds after the air evacuation step indicated in FIG. 2C, the temperature of the polycarbonate material will have fallen to roughly 150° F., at which point workers can touch the material with their fingers without being burned. Workers' hands 35 and 37 then grasp the lower edges of the upper skirt portion 9B and 9C and pry them away from pedestal 4 slightly as shown in FIG. 2E, to loosen them and allow air to move into the resulting gaps.

The next step is to remove the molded polycarbonate material 9A from mold 3 without causing unacceptable breakage of the backdraft lip portions designated by reference numerals 9D and 9E in FIGS. 2E and 2F.

It will be appreciated by those skilled in the art that ordinarily vacumm thermoforming processes are not suitable for making plastic products which have continuous "back draft" regions such as 9D and 9E because the rigid plastic material cannot be removed from the molds without breaking such back draft portions of the plastic products. However, in accordance with the present invention, a slight bit of fracturing or breakage of the forward back draft portion 9D can be tolerated, because it will be concealed from the view of the driver and passengers in the automobile in which snap-on cover 9 is later installed, since such back draft portions will tend to be located below the forward upper surface of the installed snap-on cover 9 and frequently will be "tucked" or wedged beneath the dashboard pad material when the snap-on cover is installed.

In FIG. 2F, it can be seen that the rearward backdraft portion 9E is held against the rearward peripheral portion 3D of mold 3, thereby avoiding too much stress from occurring on rearward back draft peripheral portion 9E. A worker's hand 37 prys the forward skirt portion 9B forward in the direction indicated by arrow 39 and forces forward back draft portion 9D upward over front peripheral portion 3C of mold 3, causing any breakage or fracturing of the back draft portion of cover 9A to occur thereat. Usually, any slight fracturing and breakage that occurs will occur at the corner points designated by reference numerals 18A and 18B in FIG. 1. The slight amount of fracturing and breakage that actually occurs at these two points has been found to be entirely acceptable because it does not interfere in any way with the function, reliability or appearance of snap-on dashboard pad cover 9 when installed in an automobile.

The next step of the manufacturing process is to utilize a pair of scissors to manually cut all of the skirt portions 9C′ (including skirt portions 9C and 9B, as shown in FIGS. 2E and 3F) cleanly away from the continuous peripheral portions 9D and 9E (FIG. 1A), thereby producing the clean, smooth continuous edge designated by reference numeral 10 in FIG. 1A. Ordinarily, best results will occur if the entire process beginning with the lowering of clamp frames 11A and 11B in FIG. 2C to the removal of the snap-on cover 9 as indicated in FIG. 2F occurs in less than roughly 30–120 seconds, before the temperature of the polycarbonate material falls low enough that an unacceptable amount of friction and shrinkage occurs, causing fracturing and/or cracking of the back draft region 9D during removal from mold 3.

After the peripheral skirt portion 9C′ (FIG. 2G) has been completed, the unit is ready for installation on a sun-damaged dashboard pad such as 49 in FIG. 3. By applying glue to the under surface of snap-on cover 9, mainly for the purpose of preventing it from rattling as a result of being buffeted by wind currents from vent openings or through windows of the automobile, snap-on cover 9 is simply aligned over dashboard pad 49, its rearward back draft portion 9E is positioned under corresponding portion 49A of dashboard pad 49, and the forward back draft portion 9D is forced downward and "snapped" over the forward edge portions 49C and 49B of dashboard pad 49.

For certain model automobiles, it may be advantageous to cut the forward portion of snap-on cover 9 along a line designated by reference numeral 43 if the structure of the automobile's forward dashboard structure 53 will prevent the back draft portion 9D from being pushed sufficiently far downward to pass around the portion 49B of dashboard pad 49. In such a case, the portion 49B of the dashboard pad 49 will not be visible either to occupants of the vehicle or from outside the vehicle through windshield 47 thereof due to the presence of a metal panel 51. In this event, it will be important to make sure that the glue is applied along the entire peripheral forward portion 9F of snap-on cover 9, since the glue, rather than the back draft portion 9D of cover 9, will be relied upon to hold part of portion 9F against the forward portion of dashboard pad 49.

Preferably, the original sheet of polycarbonate material 9A has an upper surface that has a slightly roughened configuration to provide a "leather-like" grained appearance, since this is what most original vinyl-covered dashboard pads have as their original finish. By providing a suitable sprayed dye or sprayed paint on the outer surface of snap-on cover 9 after it has been formed by the above-described manufacturing process, the snap-on dashboard cover can have an appearance that is similar to that of an original equipment vinyl covered dashboard pad. If polycarbonate material having a thickness of roughly 30 mils is used the resulting structure will be sufficiently rigid to provide an ideal, low cost, temperature resistant, easily maintained cover for a sun-damaged dashboard pad and the snap-on cover can be installed easily and quickly by any buyer without the need for loosening or removing the sun-damaged dashboard pad from the dashboard substructure.

Although polycarbonate material has been found to be ideal for making snap-on cover 9, other materials, such as the plastic material sold under the trademark "NORELL", can also be used. It is essential that the material used, the paint or dye finished utilized, and the glue utilized be able to withstand the heat and thermal expansion and contraction resulting from daily exposure to intense sunlight. One glue that has been found to work well is 3M Landau top glue manufactured by 3M Company. The polycarbonate sheet material with a satisfactory leather grain finish is available from Rohm and Haas, Inc., or General Electric Company.

It should be appreciated that the polycarbonate material subjected to the process shown in FIGS. 2A–2F shrinks rapidly when it has been vacuum formed to conform to the configuration of mold 3. If it is allowed to cool to much less than 150° F., longitudinal cracks will develop, so it is critical that the clamp frame lowering, air evacuation, and snap-on cover removal steps be performed very rapidly to avoid excessive cooling before removal from the mold. It should be appreciated that mold 3 could be formed directly from an original equipment dashboard pad of a particular model automobile. If this is done, the final snap-on cover 9 usually will shrink perhaps one fourth of an inch in length, making it too short to be installed on an actual dashboard pad in an automobile. This problem can be alleviated by trimming approximately one-half inch from the length of the pre-existing dashboard pad before snapping snap-on cover 9 onto the dashboard pad. Alternatively, the length of mold 3 can be increased by one-fourth of an inch to one-half of an inch to compensate for this problem.

While the invention has been described with reference to a particular embodiment thereof, those skilled in the art will be able to make various modifications to the described snap-on cover and process for manufacturing it without departing from the true spirit and scope of the invention. It is intended that all substantial equivalents of the disclosed and claimed embodiments of the invention be encompassed by the claims.

Although 30 mil thick polycarbonate material has been referred to herein as "brittle" or "rigid", it is sufficiently flexible to transmit energy to the original underlying dashboard pad in the event of an accident and is sufficiently resilient and rigid to return to and maintain its initial shape. The polycarbonate material is sufficiently rigid that the peripheral back draft portion securely holds the installed snap-on cover on the dashboard pad during its useful life and can be subjected to considerable forces without bending during handling, shaping and installation.

I claim:

1. A method of making a snap-on cover for a vinyl-covered dashboard pad installed on a dashboard substructure in an automobile, said method comprising the steps of:
    (a) positioning a mold having a shape that precisely conforms to the outer shape of said dashboard pad on a support, the entire peripheral portion of said mold extending beyond said support;
    (b) heating a sheet of thermoplastic material to a predetermined degree of softness;
    (c) lowering said thermoplastic sheet over said mold to cause said thermoplastic sheet to be draped over said mold and creating a region that is substantially sealed from outside air;
    (d) withdrawing air from said region while said thermoplastic material is still hot to cause said thermoplastic material to be drawn tightly against and conform to the shape of said mold and said support, said thermoplastic material forming a peripheral back draft portion extending from the peripheral portions of said mold to the upper portion of said support and a skirt portion surrounding said support;
    (e) severing a lower section of said skirt portion from an upper portion thereof;
    (f) while said thermoplastic material is still at least a predetermined temperature, but has substantially hardened into a rigid configuration, separating a forward portion of the upper portion of said skirt from said support and the forward portion of said mold, the forward portion of said mold corresponding to the portion of said dashboard pad closest to the windshield of the automobile;
    (g) lifting and slipping the forward portion of said thermoplastic material around the forward peripheral portion of said mold to cause any fracturing or breaking of said peripheral back draft portion to occur in the forward portion of the snap-on cover as installed on said vinyl-covered dashboard pad;
    (h) cleanly cutting peripheral portions of said skirt away from said peripheral back draft portion;
    (i) applying glue to the inner surface of said snap-on cover and/or the surface of said vinyl-covered dashboard pad; and
    (j) snapping said cover onto said dashboard pad.

2. The method of claim 1 wherein said thermoplastic material is polycarbonate material.

3. The method of claim 2 including supporting said sheet of thermoplastic material in a clamp frame, wherein step (b) includes heating said thermoplastic sheet to a sufficiently high temperature that said sheet sags a predetermined amount.

4. The method of claim 3 wherein said sheet of thermoplastic material is heated to a sufficiently high temperature that is becomes sufficiently soft that lightly tapping the sagging sheet produces easily visible riples that propagate throughout the sagging sheet.

5. The method of claim 4 wherein step (c) is completed within approximately two seconds after removing said sheet from a source of heat applied in step (b).

6. The method of claim 5 wherein step (g) is completed within approximately 30 seconds after the beginning of step (c).

* * * * *